3,012,180
INERTIAL ALTITUDE SERVOMOTOR CONTROL SYSTEM
Rodger C. Finvold, San Diego, Calif., assignor to Ryan Aeronautical Co., San Diego, Calif.
Filed Apr. 6, 1959, Ser. No. 804,288
1 Claim. (Cl. 318—457)

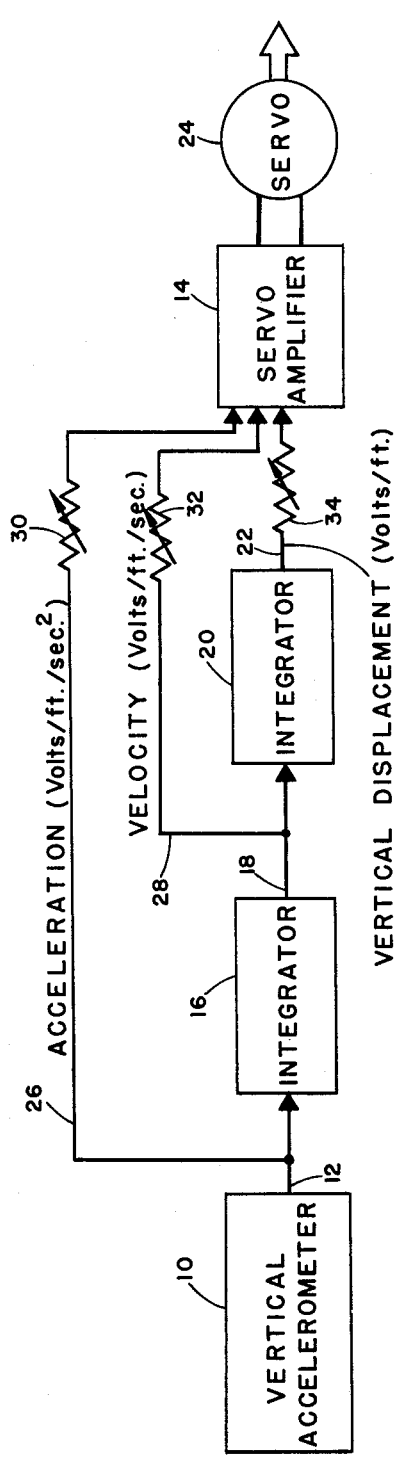
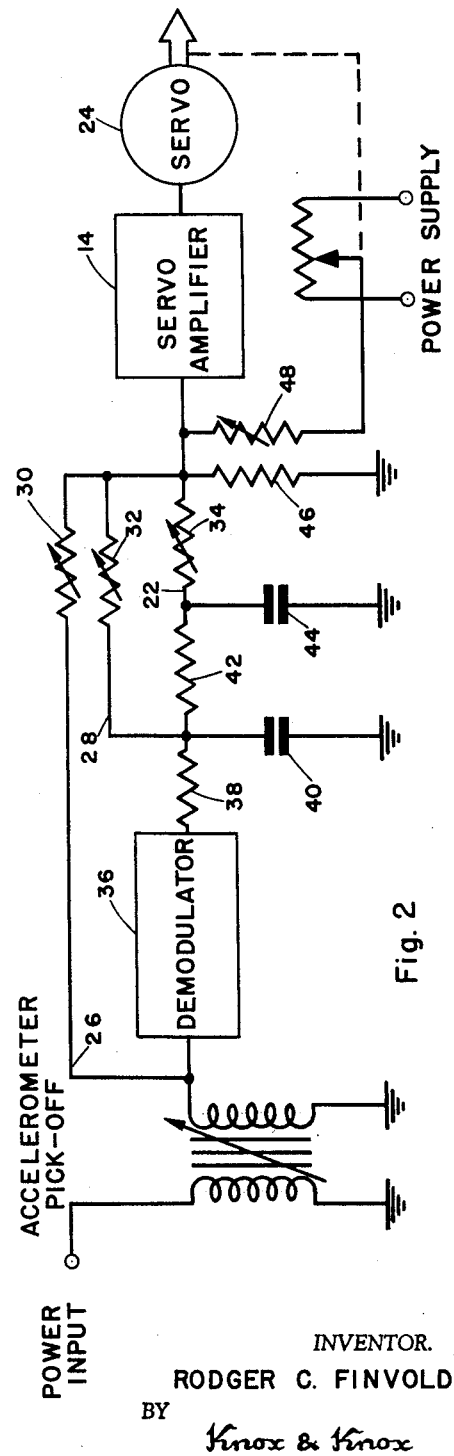

The present invention relates generally to aircraft controls and more particularly to an inertial altitude control system. This system may be combined with the pilot operated throttle control to correct overcontrol and to achieve stability at a selected altitude for a short period of time on the order of one minute. It is recognized that use of an undamped throttle control results in production of not pure altitude control but the introduction of a vertical acceleration which leads to overcontrol, error, overcorrection and a generally unsatisfactory divergent system. In this invention, the vertical acceleration, thus unavoidably introduced by the pilot, is detected and used to control a servo adapted to compensate for errors in the primary pilot-operated control, the signal from the accelerometer being doubly integrated and damped in a novel manner hereinafter set forth in detail.

The present invention represents a system which can be connected, as stated above, with the throttle control or which can be connected to other control parameters such as the elevators when aerodynamic damping is available.

This novel system was primarily developed for use in VTOL aircraft, especially in landing such craft, since here accuracy of altitude control on the order of inches of error is a virtual necessity. However, an altitude control system implementing the present invention is applicable to stabilization of bombing or fire control platforms. The precise, short term, stabilization of altitude accomplished has obvious application in providing for greater passenger comfort in commercial planes when rough air is encountered and in negotiating smooth landings, this last being applicable to virtually all aircraft.

Obviously, in stable platforms and like applications where the primary altitude control means is automatic and scheduled there is no human overcontrol or error but this invention is equally applicable to such devices and for the same general purpose, namely, stabilization of the vehicle for at least short periods of time at the commanded altitude.

The primary object of this invention is to provide an aircraft altitude control system which uses a vertical accelerometer as the sensing element in a novel circuit, the system having damping means to prevent hunting or oscillation in the control.

More specifically, this invention is to provide an altitude control system in which the vertical acceleration is doubly integrated and acceleration and velocity signals combined therewith to produce a compound damped signal which is used to control actuation of altitude correction means.

Still another object of this invention is to provide an altitude control system which will maintain a chosen altitude within close, predetermined limits, for a short period of time regardless of actual altitude.

A further object of this invention is to provide an altitude control system which can be constructed from existing components and may be adapted to many types of aircraft without interfering with the normal controls.

Finally, it is an object to provide an inertial altitude control system of the aforementioned character which is simple, safe and convenient to operate and which will give generally efficient and durable service.

With these and other objects definitely in view, this invention consists in the novel construction, combination and arrangement of elements and portions, as will be hereinafter fully described in the specification, particularly pointed out in the claim, and illustrated in the drawing which forms a material part of this disclosure, and in which:

FIGURE 1 is a block diagram of the basic altitude control system; and

FIGURE 2 is a partially schematic diagram showing one particular arrangement thereof.

Referring now to FIGURE 1, the system includes a vertical accelerometer 10, of suitable type, having an output 12 which provides an electrical output signal proportional to the acceleration encountered, the signal being fed directly to a servo amplifier 14. This signal is a voltage signal, the voltage impressed thereby on the amplifier 14 varying directly as the acceleration and may be considered as volts per foot per second squared. The accelerometer output 12 is also connected to a primary integrator 16, having an output 18, the integrated signal being proportional to instantaneous velocity, the integral of acceleration with respect to time, and may be regarded as volts per foot per second. This velocity signal is also fed directly into the servo amplifier 14. A portion of the integrator output 18 is integrated for a second time by being fed into a secondary integrator 20 having an output 22, the doubly integrated signal being proportional to displacement and may be considered as volts per foot. This displacement signal represents the actual altitude change and is the principal signal fed into the amplifier 14.

The displacement signal is damped by the velocity signal, and the velocity signal, in turn, is damped by the acceleration signal, this being accomplished by a portion of the acceleration signal fed directly to the servo amplifier by the shunt 26, and a portion of the velocity signal similarly handled by the shunt 28. Using the displacement signal alone to actuate the servo mechanism 24 would produce corrective results, but oscillation would occur due to over correction each time a change in direction took place, as is predicted by conventional servo theory. By adding the acceleration and velocity signals to the displacement signal, the resultant composite signal is of suitably damped form and oscillation is prevented. Control of the magnitude of the shunted signals supplied to the servo amplifier is accomplished by mixing resistances 30 and 32 to achieve the proper balance as between the displacement signal and the damping signals. A further regulation is accomplished by the mixing resistor 34 which directly controls the value of the displacement signal.

The circuitry of the servo amplifier per se and that of the integrators is conventional although it is conceived that there may be some variation in the type of those units. For example, it is conceived that mechanical integrators could be employed. The mixing resistances are variable.

The circuit is somewhat more fully illustrated in FIGURE 2. A demodulator 36 will ordinarily be inserted in front of the integrators to convert that portion of the A.C. accelerometer signal fed into the integrators. The simple RC network used in this figure to represent the primary integrator 16 is indicated at 38, 40 and the secondary integrator is illustrated similarly as a network comprising a resistance 42 and capacitance 44. A shunt resistor 46 at the output 22 completes the circuit to ground and a gain resistor 48 in the servo circuit is used to adjust the gain of the servo.

Further description would appear to be unnecessary. The operation of this invention will be clearly comprehended from a consideration of the foregoing description of the details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

An inertial altitude stabilization system for vehicles having altitude control means, comprising:

an accelerometer providing an acceleration signal; a primary integrator connected to the output of said accelerometer and providing a corresponding velocity signal;

a secondary integrator connected to the output of the primary integrator and providing a displacement signal;

a servo operatively connected with said control means; said accelerometer being the sole originating signal source of the system and said servo being controlled by a composite signal derived from all three said signals; means to demodulate said acceleration signal, whereby said displacement signal is made predominant and said acceleration and velocity signals damp said displacement signal;

a shunt by-passing portion of the original accelerometer signal around both said integrators, and a shunt by-passing a portion of said velocity signal around said secondary integrator, both said shunts being connected with the output of said secondary integrator to provide said composite signal; and mixing resistors in said shunts to control the damping imposed, by said acceleration and velocity signals, on said displacement signal.

References Cited in the file of this patent

UNITED STATES PATENTS

| | | |
|---|---|---|
| 2,415,819 | Halpert et al. | Feb. 18, 1947 |
| 2,613,071 | Hansel | Oct. 7, 1952 |
| 2,875,965 | Anderson et al. | Mar. 3, 1959 |
| 2,954,514 | Hemstreet | Sept. 26, 1960 |